United States Patent [19]

Hatakeyama

[11] Patent Number: 4,974,473
[45] Date of Patent: Dec. 4, 1990

[54] HYDRAULICALLY OPERATED TRANSMISSION

[75] Inventor: Kazuma Hatakeyama, Utsunomiya, Japan

[73] Assignee: Honda Giken Kogyo Kabushiki Kaisha, Tokyo, Japan

[21] Appl. No.: 430,209

[22] Filed: Nov. 1, 1989

[30] Foreign Application Priority Data

Nov. 7, 1988 [JP] Japan .................................. 63-280989

[51] Int. Cl.$^5$ ............................................. F16H 47/06
[52] U.S. Cl. ..................................... 74/730.1; 74/360; 475/200; 475/206
[58] Field of Search .................. 475/200, 206; 74/333, 74/360, 364, 730.1

[56] References Cited

U.S. PATENT DOCUMENTS

| | | | |
|---|---|---|---|
| 3,465,609 | 9/1969 | Fisher et al. | 74/364 X |
| 3,858,455 | 1/1975 | Sisson et al. | 74/360 |
| 4,106,358 | 8/1978 | Morrison | 74/360 X |
| 4,145,935 | 3/1979 | Herlitzek | 74/360 X |
| 4,388,838 | 6/1983 | Richards et al. | 74/360 X |
| 4,570,503 | 2/1986 | Theobold | 74/360 |
| 4,771,647 | 9/1988 | Stevens | 74/360 X |
| 4,793,213 | 12/1988 | Nishimura | 74/730.1 |
| 4,864,881 | 9/1989 | Beeson et al. | 74/360 |
| 4,934,207 | 6/1990 | Ishikawa et al. | 74/364 |

FOREIGN PATENT DOCUMENTS

| | | | |
|---|---|---|---|
| 54-42561 | 4/1979 | Japan | 74/730.1 |
| 54-144545 | 11/1979 | Japan | 74/730.1 |
| 61-74963 | 4/1986 | Japan | 74/730.1 |
| 716884 | 2/1980 | U.S.S.R. | 74/730.1 |

*Primary Examiner*—Dwight Diehl
*Attorney, Agent, or Firm*—Armstrong, Nikaido, Marmelstein, Kubovcik & Murray

[57] ABSTRACT

A hydraulically operated transmission having first- to fourth-speed gear trains established by first-speed to fourth-speed hydraulic clutches, a one-way clutch incorporated in the first-speed gear train for permitting overrotation of an output side, and a first-speed maintaining hydraulic clutch also in the first-speed gear train parallel with the one-way clutch. The transmission includes first and second input shafts and an output shaft in parallel with one another within a transmission case. The first input shaft is connected to a fluid torque converter, through that end wall of the transmission case which is closer to an engine and to which a valve block is assembled. The first and second input shafts are rotatably connected at an opposite end to the engine, through an idle gear on the output shaft. The first-speed to fourth-speed gear trains are divided into two sets, each set including two gear trains, the two gear trains of one set being interposed in parallel between the first input shaft and the output shaft, the two hydraulic clutches for establishing the two gear trains of the one set being disposed in a back-to-back relation on the first input shaft, the two gear trains of the other set being interposed in parallel between the second input shaft and the output shaft, the two hydraulic clutches for establishing the two gear trains of the other set being disposed in a back-to-back relation on the second input shaft.

1 Claim, 2 Drawing Sheets

HYDRAULICALLY OPERATED TRANSMISSION

BACKGROUND OF THE INVENTION

The present invention relates to a hydraulically operated transmission primarily for use in an automobile.

The present applicant has previously proposed a hydraulically operated vehicular transmission shown in Japanese Unexamined Patent Application Publication No. 124469/88, which comprises first- to fourth-speed gear trains G1, G2, G3 and G4 established by corresponding hydraulic clutches C1, C2, C3 and C4, a one-way clutch a incorporated in the first speed gear train G1 for permitting overrotation of an output side, and a first-speed maintaining clutch CH also incorporated in the first-speed gear train G1 in parallel with the one-way clutch a, as shown in FIG. 2.

In this transmission, an input shaft d and an output shaft e are carried in parallel within a transmission case b. The input shaft d is connected to a fluid torque converter g connected to a crank shaft f of an engine, through that end wall i of the transmission case b which is closer to the engine and to which a valve block h is assembled. The first- to fourth-speed gear trains G1, G2, G3 and G4 are interposed in parallel between the input shaft d and the output shaft e. The first-speed hydraulic clutch C1 for establishing the first-speed gear train G1 is disposed at that end of the input shaft d which is opposite to the engine, and the third-speed hydraulic clutch C3 for establishing the third-speed gear train G3 is disposed at that end of the output shaft e which is closer to the engine. The second-speed hydraulic clutch C2 for establishing the second-speed gear train G2 and the fourth-speed hydraulic clutch C4 for establishing the fourth-speed gear train G4 are disposed in a back-to-back relation at an intermediate portion of the input shaft d. Further, a bypass shaft k is connected, through a gear j, to a drive gear G1a of the first-speed gear train G1 connected to the first-speed hydraulic clutch C1, and a first-speed maintaining hydraulic clutch CH is disposed on the bypass shaft k so as to connect the bypass shaft k with the output shaft e through a drive gear and a driven gear of the fourth-speed gear train G4. Thus, when both of the first-speed hydraulic clutch C1 and the first-speed maintaining hydraulic clutch CH have been brought into engagement, the first-speed gear train G1 is established by a path G1' bypassing the one-way clutch a.

In FIG. 2, the reference character GR is a reverse gear train which commonly uses the fourth-speed hydraulic clutch C4 with the fourth-speed gear train G4, so that the reverse gear train GR and the fourth-speed gear train G4 are selectively established, through a selector gear 1, on the output shaft e.

The above described transmission is accompanied by the following problem: Because the three hydraulic clutches C1, C2 and C4 for the first-, second- and fourth-speed gear trains G1, G2 and C4 are disposed on the input shaft d, the input shaft d is too long, resulting in a longer axial size of the transmission.

The present invention has been accomplished with respect to such problem, and it is an object of the present invention to provide a compact transmission having a reduced axial size.

SUMMARY OF THE INVENTION

To attain the above object, there is provided a hydraulically operated transmission comprising first- to fourth-speed gear trains established by corresponding hydraulic clutches, a one-way clutch incorporated in the first-speed gear train for permitting overrotation of an output side, and a first-speed maintaining hydraulic clutch also incorporated in the first-speed gear train so as to be parallel to the one-way clutch, the transmission further including a pair of first and second input shafts and an output shaft which are carried in parallel with one another within a transmission case, the first input shaft being connected to a fluid torque converter connected to a crank shaft of an engine, through that end wall of the transmission case which is closer to the engine and to which a valve block is assembled, the first and second input shafts being rotatably connected at an end opposite to the engine, through an idle gear on the output shaft in an interlocking manner, the first- to fourth-speed gear trains being divided into two sets each set including two gear trains, the two gear trains of one of the sets being interposed in parallel between the first input shaft and the output shaft, the two hydraulic clutches for establishing, respectively, the two gear trains of the one set being disposed in a back-to-back relation on the first input shaft, the two gear trains of the other set being interposed in parallel between the second input shaft and the output shaft, the two hydraulic clutches for establishing, respectively the two gear trains of the other set being disposed in a back-to-back relation on the second input shaft, and the first-speed maintaining hydraulic clutch being disposed on the output shaft so as to be axially overlapped with the valve block.

Pairs of the four hydraulic clutches for establishing the first to fourth gear trains are disposed in a back-to-back relation on the first and second input shafts, respectively and therefore, the length of each of the input shafts can be reduced as compared with the above-described previously proposed transmission. Further, by disposition of the first-speed maintaining hydraulic clutch on the output shaft so as to be axially overlapped with the valve block, the axial size of the transmission can be reduced conjointly with the fact that the first-speed maintaining hydraulic clutch can be disposed with a good space efficiency.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
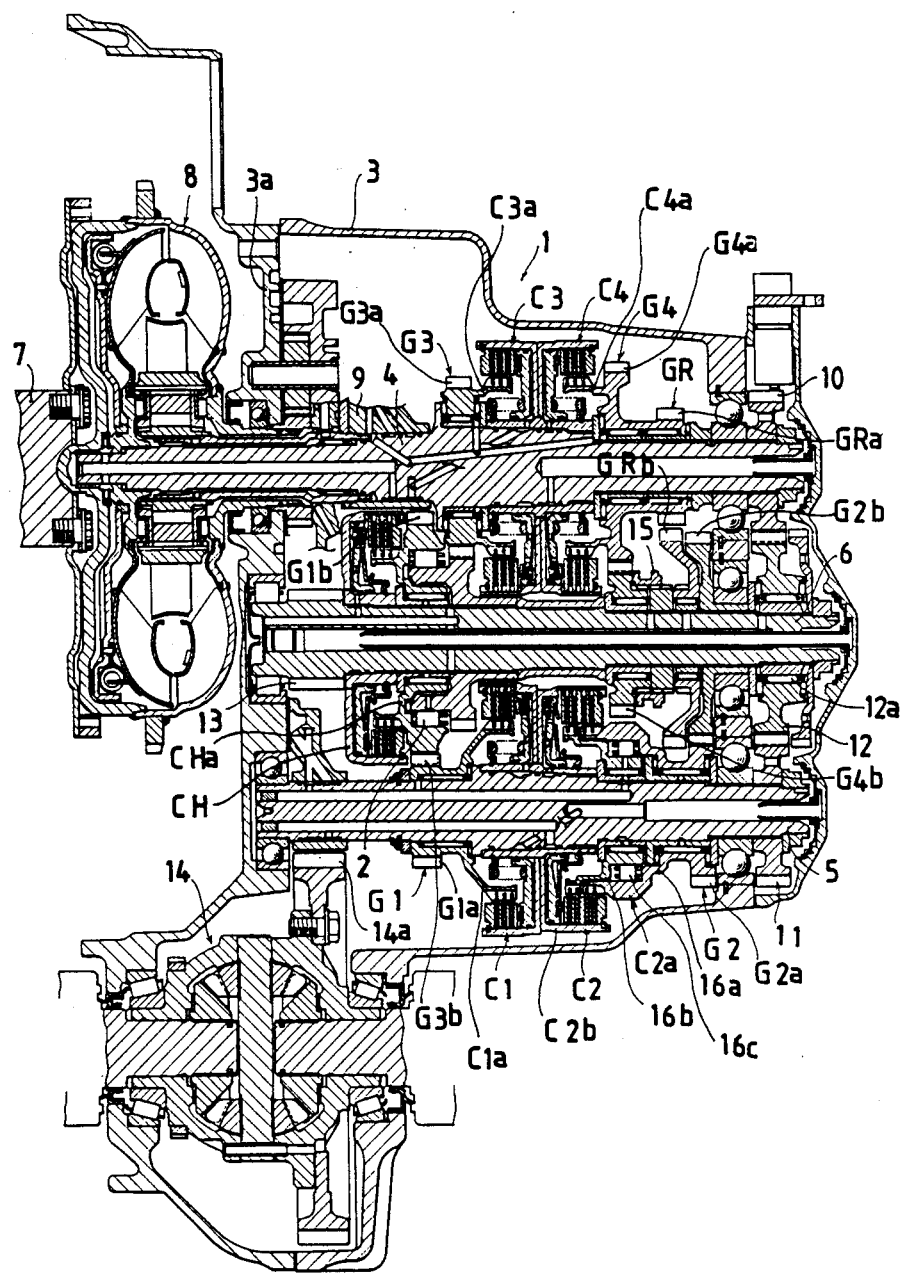
FIG. 1 is a developed view of one embodiment of a transmission according to the present invention.
Figure 2:
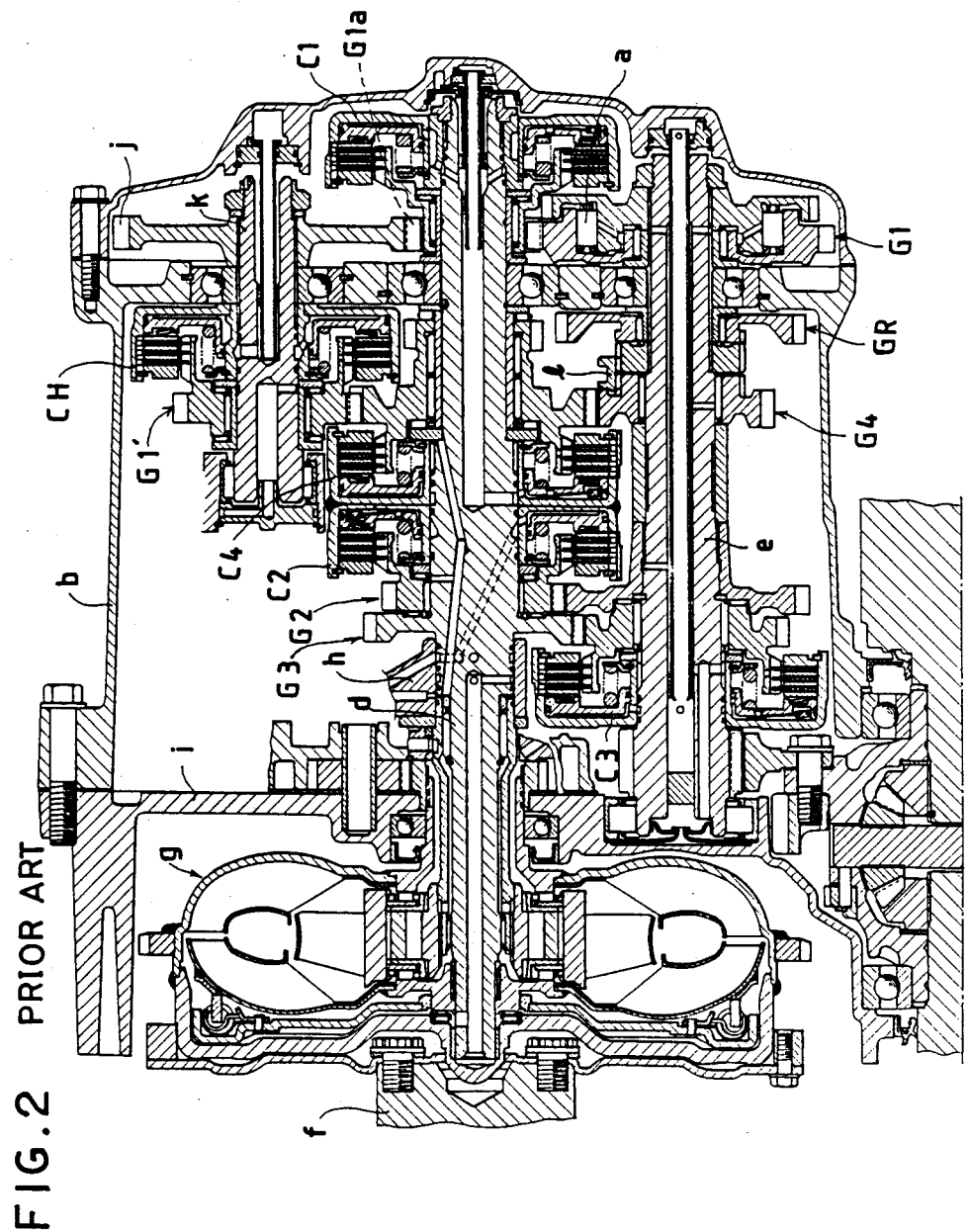
FIG. 2 is a developed sectional view of a previously proposed transmission.

Referring to FIG. 1, there is shown a hydraulically operated transmission 1 which comprises first- to fourth-speed gear trains G1, G2, G3 and G4 established by hydraulic clutches C1, C2, C3 and C4 corresponding thereto, and a reverse gear train GR. A one-way clutch 2 for permitting overrotation of an output side and a first-speed maintaining hydraulic clutch CH parallel to the one-way clutch 2 are incorporated in the first-speed gear train G1. A pair of first and second input shafts 4 and 5 and an output shaft 6 are carried in parallel with one another within a transmission case 3. The first input shaft 4 is connected to a fluid torque converter 8 connected to a crankshaft 7 of the engine, through that end wall 3a of the transmission case 3 which is closer to the engine and to which a valve block 9 is assembled. A driving gear 10 and a driven gear 11 are secured to those ends of the input shafts 4 and 5 respectively which are opposite to the engine and are meshed with an idle gear 12 carried on an end of the output shaft 6, through a bearing 12a, thereby permitting the input shafts 4 and 5 to rotate in an interlocking manner.

The first- and second-speed gear trains G1 and G2 are disposed so as to be in parallel between the second input shaft 5 and the output shaft 6. The third-speed gear train G3 and the fourth-speed gear train G4 are disposed so as to be in parallel between the first input shaft 4 and the output shaft 6. The first-speed hydraulic clutch C1 for establishing the first-speed gear train G1 and the second-speed hydraulic clutch C2 for establishing the second-speed gear train G2 are disposed in a back-to-back relation on the second input shaft 5, and the third-speed hydraulic clutch C3 for establishing the third-speed gear train G3 and the fourth-speed hydraulic clutch C4 for establishing the fourth-speed gear train G4 are disposed in a back-to-back relation on the first input shaft 4. The first-speed maintaining hydraulic clutch CH is disposed on the output shaft 6 so as to be axially overlapped with the valve block 9.

At its end closer to the engine, the output shaft 6 is integrally formed with a drive gear 13. A differential gear 14 is incorporated on the transmission case 3, and the drive gear 13 is meshed with a ring gear 14a of the differential gear 14. It should be noted that the gears 13 and 14a are shown in FIG. 1 as being spaced from each other, because FIG. 1 is a developed sectional view.

More specifically, the first-speed gear train G1 is comprised of the first-speed hydraulic clutch C1, a drive gear G1a integral with a clutch inner member C1a of the first-speed hydraulic clutch C1, a first-speed driven gear G1b integral with clutch inner member CHa of the first-speed maintaining hydraulic clutch CH, and a third-speed driven gear G3b which is connected to the output shaft 6 by means of a spline and which will be described hereinafter. The drive gear G1a is meshed with the first-speed driven gear G1b, and the one-way clutch 2 is interposed between the first-speed driven gear G1b and the third-speed driven gear G3b. Thus, the engagement of the first-speed hydraulic clutch C1 permits power to be transmitted from the second input shaft 5 to the output shaft 6 by way of the first-speed hydraulic clutch C1, the drive gear G1a, the one-way clutch 2 and the third-speed driven gear G3b. The engagement of the first-speed hydraulic clutch C1 and the first-speed maintaining hydraulic clutch CH permit power to be transmitted from the second input shaft 5 to the output shaft 6 by way of the first-speed hydraulic clutch C1, the drive gear G1a, the first-speed drive gear G1b and the first-speed maintaining hydraulic clutch CH. Therefore, the first-speed gear train G1 can be established with the one-way clutch 2 bypassed.

The second-speed gear train G2 comprises the second-speed hydraulic clutch C2, a drive gear G2a integral with a clutch inner member C2a of the second-speed hydraulic clutch C2, and a second-speed driven gear G2b secured to the output shaft 6 and meshed with the driven gear G2a. Thus, the engagement of the second-speed hydraulic clutch 2 permits power to be transmitted from the second input shaft 5 to the output shaft 6 by way of the second-speed hydraulic clutch C2, the drive gear G2a, and the second-speed driven gear G2b.

The third-speed gear train G3 comprises the third-speed hydraulic clutch C3, a drive gear G3a integral with a clutch inner member C3a of the third-speed hydraulic clutch C3, and the third-speed driven gear G3b meshed with the drive gear G3a. Thus, the engagement of the third-speed hydraulic clutch C3 permits power to be transmitted from the first input shaft 4 to the output shaft 6 by way of the third-speed hydraulic clutch C3, the drive gear G3a, and the third-speed driven gear G3b.

The fourth-speed gear train G4 comprises the fourth-speed hydraulic clutch C4, a drive gear G4a integral with a clutch inner member C4a of the fourth-speed hydraulic clutch C4, and a fourth-speed driven gear G4b provided on the output shaft 6 and meshed with the drive gear G4a. Further, a drive gear GRa of the reverse gear train GR is formed integrally with the drive gear G4a. A drive gear GRb of the reverse gear train GR meshed with the drive gear GRa, through an idle gear (not shown), and the fourth-speed driven gear G4b of the fourth-speed gear train G4 can be selectively coupled to the output shaft 6 by switching of a selector gear 15 on the output shaft 6 between a right-hand reverse position and a lefthand forward position (i.e., the position shown) as viewed in FIG. 1. If the selector gear 15 is switched to the forward position, power may be transmitted from the first input shaft 4, through the fourth-speed hydraulic clutch C4, the drive gear G4a, the fourth-speed driven gear G4b and the selector gear 15, to the output shaft 6 by the engagement of the fourth-speed hydraulic clutch C4. On the other hand, if the selector gear is switched to the reverse position, power may be transmitted from the first input shaft 4, through the fourth-speed hydraulic clutch C4, the drive gear GRa, the idle gear (not shown), the driven gear GRb and the selector gear 15, to the output shaft 6 by the engagement of the fourth-speed hydraulic clutch C4.

When automatic speed changing is performed, the first-speed hydraulic clutch C1 is normally in engagement. When the second-speed hydraulic clutch C2 has been brought into engagement, the transmitting of power through the first-speed gear train G1 automatically ends by the action of the one-way clutch 2.

On the other hand, when a vehicle travels under engine-braking provided by the first-speed gear train G1, both of the first-speed hydraulic clutch C1 and the first-speed maintaining hydraulic clutch CH may be brought into engagement to establish the first-speed gear train G1 in the power transmitting path with the one-way clutch 2 bypassed as described above so that a counter driving torque may be transmitted from driving wheels to the engine.

The clutch inner member C2a of the second speed hydraulic clutch C2 is divided into a first inner element 16a and a second inner element 16b which are engaged, in parallel, with a clutch outer member C2b of the second-speed hydraulic clutch C2. The second-speed drive gear G2a is formed on the first inner element 16a, and the second inner element 16b is connected to the first inner element 16a through a one-way clutch 16c for permitting overrotation of the first inner element 16a.

Thus, when the third speed hydraulic clutch C3 starts to engage before disengagement of the second-speed hydraulic clutch C2 during upshift operation from a second-speed stage to a third-speed stage, thereby providing concurrent coupling to prevent the engine racing, the revolution speed of the input side of the second-speed hydraulic clutch C2 is reduced by starting the engagement of the third-speed hydraulic clutch C3, while at the same time, the one-way clutch 16c is disengaged. The second-speed gear train G2 is kept engaged only by an engaging force for the first inner element 16a, so that the engaging force for the second-speed hydraulic clutch C2 is reduced substantially by half, and the slippage of such clutch C2 rapidly increases. For this reason, even if the disengagement of the second-speed hydraulic clutch C2 is delayed, a braking phenomenon due to the concurrent coupling is suppressed, with the result that a smooth upshift operation can be performed.

On the other hand, during downshift operation from third speed to second speed, when the second-speed hydraulic clutch C2 starts to engage after the disengagement of the third-speed hydraulic clutch C3 but before the revolution speed of the input side becomes equal to that of the output side, the one-way clutch 16C does not engage until such time that the revolution speed of the input side is increased up to the revolution speed of the output side after the second-speed hydraulic clutch C2 has started to engage. During this period, the engagement force of the second-speed hydraulic clutch C2 is provided only by the engagement of the first inner element 16a, so that the second-speed hydraulic clutch C2 easily slips, such slippage resulting in alleviation of the load taken on by the output side to increase the revolution speed of the input side. This in turn prevents a sharp decrease in the driving torque. When the revolution speed of the input side is increased to that of the output side, the one-way clutch 16c engages to increase the engagement force of the second-speed hydraulic clutch C2 to a level high enough to convey the torque necessary for acceleration. Thus, downshift operation is smoothly performed.

When engine braking is applied, the counter driving torque is transmitted only through the engagement of the first inner element 16a of the clutch. Since the engagement force of the hydraulic clutch to be obtained when the clutch is completely engaged is set at a level high enough to carry the maximum torque of the engine and the counter driving torque is far smaller compared with the maximum engine torque, the clutch retains a sufficiently high engagement force to transmit the counter driving torque even when the engagement force is halved. Therefore, the effectiveness of engine braking will not be decreased.

Here, the axial sizes will be compared between the transmission of the present embodiment and the previously proposed transmission. In the present embodiment, the first- to fourth-speed gear trains G1, G2, G3 and G4 are accommodated in the same axial space as the one for the second- and fourth-speed gear trains G2 and G4 in the previously proposed transmission, and the first-speed maintaining hydraulic clutch CH is accommodated in the same axial space as the one for the third-speed gear train G3 in the previously proposed transmission. In addition, the drive gear 10 on the first input shaft 4, the driven gear 11 on the second input shaft 5 and the idle gear 12 on the output shaft 6 are accommodated in the same axial space as the one for the first-speed gear train G1 in the previously proposed transmission.

In the present embodiment, the axial size of the transmission can be reduced at least by the axial space for the first-speed hydraulic clutch C1 in the previously proposed transmission. In the present embodiment, the hydraulic clutches C1 and C2, for establishing one set of the first- and second-speed gear trains G1 and G2, have been disposed on the second input shaft 5, while hydraulic clutches C3 and C4, for establishing one set of the third- and fourth-speed gear trains G3 and G4, have been disposed on the first input shaft 4, but is should be understood that the present invention is not limited thereto, and any combination of them is possible.

As discussed above, according to the present invention, pairs of the four hydraulic clutches for establishing the first- to fourth-speed gear trains are disposed in a back-to-back relation on the first and second input shafts, respectively, and the first-speed maintaining hydraulic clutch is disposed on the output shaft so as to be axially overlapped with the valve block. Therefore, the length of each of the input shafts can be reduced as compared with that of a previously proposed transmission, and the first-speed maintaining hydraulic clutch can be disposed within the transmission case with a good space efficiency, leading to an effect to provide a compact transmission having a reduced axial size.

It is readily apparent that the above-described has the advantage of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

What is claimed is:

1. A hydraulically operated transmission comprising first- to fourth-speed gear trains established by corresponding first-speed to fourth-speed hydraulic clutches, a one-way clutch incorporated in the first-speed gear train for permitting overrotation of an output side, and a first-speed maintaining hydraulic clutch also incorporated in the first-speed gear train so as to be in parallel with the one-way clutch, said transmission further including a pair of first and second input shafts and an output shaft carried in parallel with one another within a transmission case, said first input shaft being connected to a fluid torque converter connected to a crankshaft of an engine, through that end wall of the transmission case which is closer to the engine and to which a valve block is assembled, said first and second input shafts being rotatably connected at an opposite end to the engine, through an idle gear on said output shaft in an interlocking manner, said first-speed to fourth-speed gear trains being divided into two sets, each set including two gear trains, the two gear trains of one of the sets being interposed in parallel between said first input shaft and said output shaft, the two hydraulic clutches for establishing, respectively, said two gear trains of said one set being disposed in a back-to-back relation on said first input shaft, said two gear trains of the other set being interposed in parallel between said second input shaft and said output shaft, the two hydraulic clutches for establishing, respectively, said two gear trains of said other set being disposed in a back-to-back relation on said second input shaft, and said first-speed maintaining hydraulic clutch being disposed on said output shaft so as to be axially overlapped with said valve block.

* * * * *